(No Model.)
J. H. CALKINS.
SELF ATTACHING BOLT.
No. 519,172. Patented May 1, 1894.
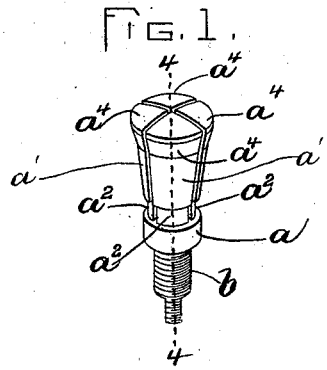
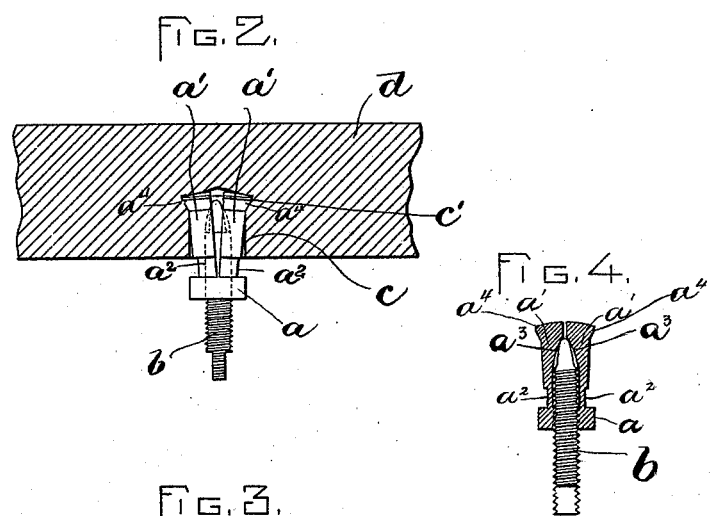
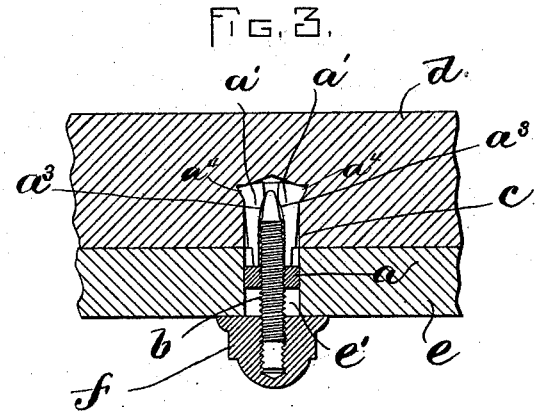
WITNESSES:
M. W. Jackson
A. D. Harrison
INVENTOR:
J. H. Calkins
by Wright Brown Crossley
Attys.

UNITED STATES PATENT OFFICE.

JAMES H. CALKINS, OF WAKEFIELD, MASSACHUSETTS, ASSIGNOR OF ONE-HALF TO TIMOTHY J. McHUGH, OF SAME PLACE.

SELF-ATTACHING BOLT.

SPECIFICATION forming part of Letters Patent No. 519,172, dated May 1, 1894.

Application filed August 31, 1893. Serial No. 484,443. (No model.)

*To all whom it may concern:*

Be it known that I, JAMES H. CALKINS, of Wakefield, in the county of Middlesex and State of Massachusetts, have invented certain new and useful Improvements in Self-Attaching Bolts, of which the following is a specification.

This invention has for its object to provide means for readily attaching a bolt to a marble slab or other article having formed in it a hole or socket enlarged at its inner end, the invention being intended principally as a means for securing a set bowl or basin to the marble slab.

The invention consists in a nut provided with a series of arms permanently connected with the butt and provided with inclined faces, said arms collectively forming an expansible head, combined with a screw-threaded bolt engaged with said nut and formed at its inner end to bear on said faces, whereby, when said bolt is turned into the head, it will force the arms outwardly, thereby expanding said head, as I will now proceed to describe and claim.

Of the accompanying drawings forming a part of this specification—Figure 1 represents a perspective view of a self-attaching bolt embodying my invention. Fig. 2 represents a side view of the same showing in section a portion of the marble slab with which it is engaged. Fig. 3 represents a sectional view showing the marble slab and portion of the bowl attached thereto, and a sectional view of my improved self-attaching bolt and its clamping nut. Fig. 4 is a section on line 4, 4 of Fig. 1.

The same letters of reference indicate the same parts in all the figures.

In the drawings—$a$ represents a nut which is preferably of circular form, and is provided with a series of arms $a'$ preferably four in number, said arms being integral with the nut, and projecting from one side thereof. The form and arrangement of the arms are such that they collectively constitute an expansible head enlarged at its outer end and preferably beveled, as shown in the drawings. Each arm $a'$ is connected with the nut $a$ by means of a comparatively slender neck $a^2$ which is adapted to be easily bent. The arms are provided with beveled or inclined inner faces $a^3$ as shown in Figs. 3 and 4. Below the faces $a^3$ the arms are internally recessed or cut away to accommodate the bolt $b$. Said bolt is formed to engage the nut $a$, and its inner end is adapted to bear upon the inclined faces $a^3$ of the arms $a'$. When the bolt is rotated in the nut in such direction as to cause it to move toward the outer ends of the arms $a'$, or, in other words, into the expansible head, its inner end bearing upon the inclined faces $a^3$ forces the arms outwardly by bending the necks $a^2$, thus moving the arms from the position shown in Figs. 1 and 4 to the position shown in Figs. 2 and 3. The head is thus expanded so that its beveled or enlarged outer end is engaged with the enlargement $c'$ formed at the inner end of the hole or socket $c$ in the marble slab $d$.

The improved device may be used as follows to connect to the slab $d$ the arm $e$ of the set bowl or basin. A hole $e'$ is formed in the rim $e$ corresponding in size to the hole $c$ in the slab $d$. The expansible head is then inserted in the hole $c$ before being expanded and is then engaged with the slab by adjusting the screw so as to force the arms outwardly as shown in Fig. 2. The rim $e$ is then placed upon the nut $a$, the bolt $b$ projecting through said rim, and the clamping nut $f$ is then screwed upon the projecting end of the bolt until it bears upon the rim $e$ and presses the latter firmly against the slab $d$. The beveled enlargements $a^4$ at the outer ends of the arms $a'$ engage the arms positively with the wall of the hole in which the head is inserted, and prevent any possibility of the removal of the head and nut from said hole so long as the bolt $b$ is in place. The beveled form of said enlargements makes them acute-angled at their outer ends, and therefore capable of indenting or cutting into the wall of the hole in case the material in which the hole is formed is compressible like wood.

I claim—

1. A nut provided with a series of arms permanently connected with the nut and provided with inclined inner faces, said arms collectively forming an expansible head, combined with a screw-threaded bolt engaged with said nut and formed at its inner end to bear on said faces, whereby, when said bolt is turned into the head, it will force the arms outwardly, thereby expanding said head, as set forth.

2. A nut provided with a series of arms or sections, collectively forming an expansible head, and provided at their inner sides with inclined faces and at their outer sides with beveled enlargements; combined with a screw-threaded bolt, engaged with said nut, and formed at its inner end to bear on said inclined faces and force the arms outwardly, whereby said enlargements may be engaged with the wall of a hole in which the head may have been inserted; as set forth.

In testimony whereof I have signed my name to this specification, in the presence of two subscribing witnesses, this 21st day of August, A. D. 1893.

JAMES H. CALKINS.

Witnesses:
TIMOTHY J. McHUGH,
JAMES F. CURLEY.